(12) United States Patent
Rastogi

(10) Patent No.: US 8,630,871 B2
(45) Date of Patent: *Jan. 14, 2014

(54) METHODS FOR GENERATING HEALTHCARE PROVIDER QUALITY AND COST RATING DATA

(75) Inventor: Amita Rastogi, Munster, IN (US)

(73) Assignee: OptumInsight, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,533

(22) Filed: Oct. 18, 2011
(Under 37 CFR 1.47)

(65) Prior Publication Data

US 2012/0116985 A1 May 10, 2012

Related U.S. Application Data

(63) Continuation of application No. 11/939,900, filed on Nov. 14, 2007, now Pat. No. 8,069,080.

(51) Int. Cl.
*G06Q 10/00* (2012.01)

(52) U.S. Cl.
USPC .............................................................. 705/2

(58) Field of Classification Search
USPC .............................................................. 705/2
See application file for complete search history.

(56) References Cited

U.S. PATENT DOCUMENTS

| | | | |
|---|---|---|---|
| 5,544,044 A | 8/1996 | Leatherman | |
| 5,835,897 A | 11/1998 | Dang | |
| 7,801,749 B2 | 9/2010 | Lynn et al. | |
| 2003/0158751 A1 | 8/2003 | Suresh et al. | |
| 2004/0111291 A1 | 6/2004 | Dust et al. | |
| 2007/0156455 A1 | 7/2007 | Tarino | |
| 2009/0006129 A1* | 1/2009 | Thukral et al. | 705/2 |

OTHER PUBLICATIONS

Paul Cartmell; What is Medicare PPS?; Mar. 28, 2013; eHOW.com; 3 pages.*

Press Release, "Med-Vantage Innovative Patent Empowers Health Plan Members to Compare Physician Quality and Cost", Jul. 26, 2006.

* cited by examiner

*Primary Examiner* — Thomas Dixon
(74) *Attorney, Agent, or Firm* — Nathaniel P. Longley; Dorsey & Whitney LLP

(57) ABSTRACT

A method for generating healthcare provider quality rating data includes grouping claim records into one or more claim groups, assigning each claim group to a responsible provider, assessing the claim records in each claim group using guidelines for the particular disease or condition, and generating a compliance score for the claim group, wherein the compliance score indicates the extent to which the claim records in the claim group match the guidelines, and generating normalized provider quality rating data. A method for generating healthcare provider cost rating data includes grouping claim records into one or more claim groups, assigning each claim group to a responsible provider, calculating the total cost of each claim group, aggregating the total cost for each claim group, and comparing the total aggregate cost of each claim group assigned to each provider to an expected cost value.

25 Claims, 18 Drawing Sheets

RETURN TO RESULTS  START NEW SEARCH  SAVE THIS SEARCH                    PRINT  ? HELP

Smith, John James    DISPLAY MAP                   Specialty: Cardiology,
MD                                                 Internal Medicine
7777 Main St                                           Accepted Plans: Leader
Kalamazoo, MI 44000                                    Preferred Plan POS,
(999) 333-3333                                         Wellness Health Plan PPO

SUMMARY

CONDITIONS TREATED

SANCTIONS

SANCTION INFORMATION
                                                       Explain this A sanction is a disciplinary action taken against a physician, by the state reporting agency usually the Sate Medical Board, when the physician falls short of conforming to expected professional standards.

Provider sanctions data is obtained from public records published by the boards of medical practice or other organizations responsible for licensing and/or sanctioning providers. For more information regarding sanctions imposed on a particular provider, contact the sanctioning organization directly.

Last Name on Sanctions: SMITH
First Name on Sanction: JOHN
Middle Initial: JAMES

Date of Sanction: 10/20/1999

Provider Specialty on Sanction: None Given

Sanction State: DC

Sanction Board Type: Federal Boards

Sanction Source Code: Department of Health & Human Services

Sanction Board Action: Debarred/Excluded

Reason for Sanction: DEFAULTED ON HEALTH EDUCATION LOAN

Terms of Sanction: Information not available

Conditions of Sanction: SERVICES NOT REIMBURSED BY MEDICARE OR MEDICAID PROGRAM

Date Reinstated: 11/19/1999

FIG. 13

| NAME/ADDRESS | RATING | PHONE | DISTANCE | OPTIONS |
|---|---|---|---|---|
| Hospital XYZ<br>222 West 5th Steet<br>Anytown, USA 10101 | ✻ ✻ ✻ | (111) 222-4444 | 1.2 miles | VIEW RATINGS<br>ADD TO COMPARE<br>MAP HOSPITAL<br>ADD TO CONTACTS |
| Hospital ABC<br>7111 Geranium Rd<br>Anytown, USA 10101 | ✻ ✻ ✻ | (111) 221-5000 | 3.7 miles | VIEW RATINGS<br>ADD TO COMPARE<br>MAP HOSPITAL<br>ADD TO CONTACTS |
| Hospital GHI<br>38 East 10th Street<br>Anycity, USA 10000 | Insufficient Data | (111) 333-9999 | 6.9 miles | VIEW RATINGS<br>ADD TO COMPARE<br>MAP HOSPITAL<br>ADD TO CONTACTS |
| Hospital QRS<br>15 West Baker Avenue<br>Anytown USA 10100 | ✻ ✻ ✻ | (111) 311-1111 | 7.1 miles | VIEW RATINGS<br>ADD TO COMPARE<br>MAP HOSPITAL<br>ADD TO CONTACTS |
| Hospital JKL<br>3333 Second Ave<br>Anycity, USA 10001 | ✻ ✻ ✻ | (111) 313-2828 | 9.5 miles | VIEW RATINGS<br>ADD TO COMPARE<br>MAP HOSPITAL<br>ADD TO CONTACTS |

SEARCH RESULTS — PDF, FAX, PRINT, EMAIL, ? HELP
SORT BY: Distance  PER PAGE: 25
Page 1 of 1

METHODS FOR GENERATING HEALTHCARE PROVIDER QUALITY AND COST RATING DATA

CROSS-REFERENCE TO RELATED APPLICATION(S)

This application is a continuation of U.S. patent application Ser. No. 11/939,900, filed Nov. 14, 2007, and issued as U.S. Pat. No. 8,069,080 on Nov. 29, 2011, the content of which is hereby incorporated in its entirety by reference.

FIELD OF THE INVENTION

The present invention relates to methods for generating provider quality ratings and cost ratings that may be used, for example, in a consumer healthcare guide, to provide consumers with information to make better-informed healthcare choices.

BACKGROUND

The selection of healthcare services, products and providers may be difficult for consumers, for a number of reasons. Often, meaningful healthcare information is unavailable to consumers. For example, health-related costs to the consumer in any given market for any given procedure may vary, and the consumer may not have access to the current costs they may incur for receiving a health-related service or product. In addition, the quality of care may vary within any given market. For example, various providers may have differing levels of experience or skill for a given procedure, product or service, but this information typically is not available to consumers. As a result, consumers often make choices concerning their healthcare products, service and/or providers without the benefit of accurate cost and quality information.

SUMMARY

The present invention provides methods for generating provider quality ratings and cost ratings that may be utilized, for example, in a consumer healthcare guide to provide consumers with information to make better-informed healthcare choices or for analysis purposes, such as to research correlations between provider cost and quality ratings. The provider quality and cost rating data also or alternatively may be stored and analyzed for various purposes, for example, to investigate correlations between provider quality and cost ratings. Providers for whom quality and cost rating data are generated may include doctors and other providers of health-related services, as well as facilities including hospitals, clinics and other facilities at which health-related services are provided.

Provider quality and cost rating data generated by the consumer healthcare guide may be generated by utilizing a database of medical claim data collected for each provider to be assessed or rated.

A method for generating healthcare provider quality rating data may include: receiving a plurality of claim records representing services provided by a plurality of healthcare providers to one or more patients; grouping the claim records into at least one claim group, such as an episode of care, wherein each episode of care comprises claim records that relate to treatment of a patient for a particular disease or condition; assigning each claim group to a responsible provider; assessing the claim records in each claim group using guidelines for the particular disease or condition associated with the claim group and generating a compliance score for the episode, wherein the compliance score indicates the extent to which the claim records in the episode or claim group match the guidelines; aggregating the compliance score for all claim groups assigned to each respective provider to generate a raw aggregate compliance score for each provider; normalizing the provider's raw aggregate compliance score to a defined scale to generate a normalized aggregate compliance score for each provider; and generating provider quality rating data for each provider using the normalized aggregate compliance score. Quality rating data may be generated for multiple providers by aggregating the scores for each episode of care or claim group assigned to each provider to obtain a quality rating (either overall including all conditions treated or by condition) for each provider using the above-described method. The guidelines may be evidence based medicine guidelines. The aggregate raw compliance score, the normalized aggregate compliance score, and the provider quality rating data may be calculated separately for each condition or disease treated by the provider and/or calculated to include all conditions and diseases treated by the provider. The raw aggregate compliance score optionally may be normalized using average aggregate compliance values for a defined geographical region in which the provider is located. The provider quality rating data optionally may comprise one or more performance categories or graphic symbols (such as stars or a gauge similar to a thermometer) that indicate the provider's quality of treatment in comparison to an average value.

A method for generating healthcare provider cost rating data may include: receiving a plurality of claim records representing services provided by a healthcare provider to one or more patients; grouping the claim records into at least one claim group, such as an episode of care, wherein each episode of care comprises claim records that relate to treatment of a patient for a particular disease or condition; assigning episodes of care or claim groups to responsible providers; calculating the total cost of each episode of care of claim group, wherein the total cost is the sum of the costs associated with each claim record in the episode of care or claim group; aggregating the total cost for all episodes of care or claim groups assigned to each respective provider to obtain a raw aggregate cost score for each provider; comparing the total aggregate cost of each episode of care or claim group to an expected cost value; normalizing each provider's raw aggregate cost score to a defined scale to generate a normalized aggregate cost score for each provider; and generating provider cost rating data for each provider using the normalized aggregate cost score. Cost rating data may be generated for multiple providers by aggregating the scores for each claim group assigned to each provider to obtain a cost rating (either overall including all conditions treated or by condition) for each provider using the above-described method. The expected cost value for an episode of care or claim group may be an average risk-adjusted cost value calculated from historical cost data. The aggregate raw cost score, the normalized aggregate cost score, and the provider cost rating data may be calculated separately for each condition or disease treated by the provider and/or calculated to include all conditions and diseases treated by the provider. The raw aggregate cost score optionally may be normalized using average aggregate cost values for a defined geographical region in which the provider is located. The provider cost rating data may comprise one or more performance categories or graphic symbols, such as gauges, that indicate the provider's cost of treatment in comparison to an average value.

The provider quality and/or cost rating data generated by the above described methods may be utilized in a consumer healthcare that enables consumers to access quality and/or cost rating information concerning healthcare providers (including healthcare practitioners, such as physicians, and/or healthcare facilities, such as hospitals). The guide may provide consumers with increased transparency in relative cost and quality in the healthcare marketplace, which enables the consumer to make better-informed healthcare decisions.

In implementations in which both cost data and quality data are provided, the guide may enable consumers to weigh cost and quality information in selecting a provider to identify the best quality level at their desired cost level. The consumer healthcare guide may be, for example, a web-based provider lookup tool that provides cost and/or quality data relating to providers such as physicians or hospitals.

Additionally, provider volume data, including such information as the number of procedures (overall and/or specific procedures) performed by each provider, patient age ranges, patient gender information (such as number or percentage of male and female patients), and/or top conditions treated or procedures performed by each provider, may be provided by the guide.

Additionally or alternatively, the quality and/or cost rating data generated by the methods described herein may be utilized for data analysis, for example, to research correlations between cost and quality for health care providers or to assess the performance of providers based upon their relative quality and cost ratings (for example, to identify providers who provide high quality care at low to average cost).

These and other features and advantages of the present invention will become apparent to those skilled in the art from the following detailed description, wherein it is shown and described illustrative implementations of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DESCRIPTION OF THE DRAWINGS

FIGS. 2-16 depict illustrative displays of rating data, such as generated using the methods of FIGS. 1A and 1B, which may be accessed and utilized by the system and method of FIGS. 1C and 1D.

DETAILED DESCRIPTION

Methods for generating health care provider quality rating data and cost rating data that may be utilized, for example, in a consumer healthcare guide or to research correlations between cost and quality for health care providers are described below with reference to the accompanying drawings.

Providers for whom quality and/or cost rating data generated may include doctors and other providers of health-related services, as well as facilities including hospitals, clinics and other facilities at which health-related services are provided.

Figure 1A:
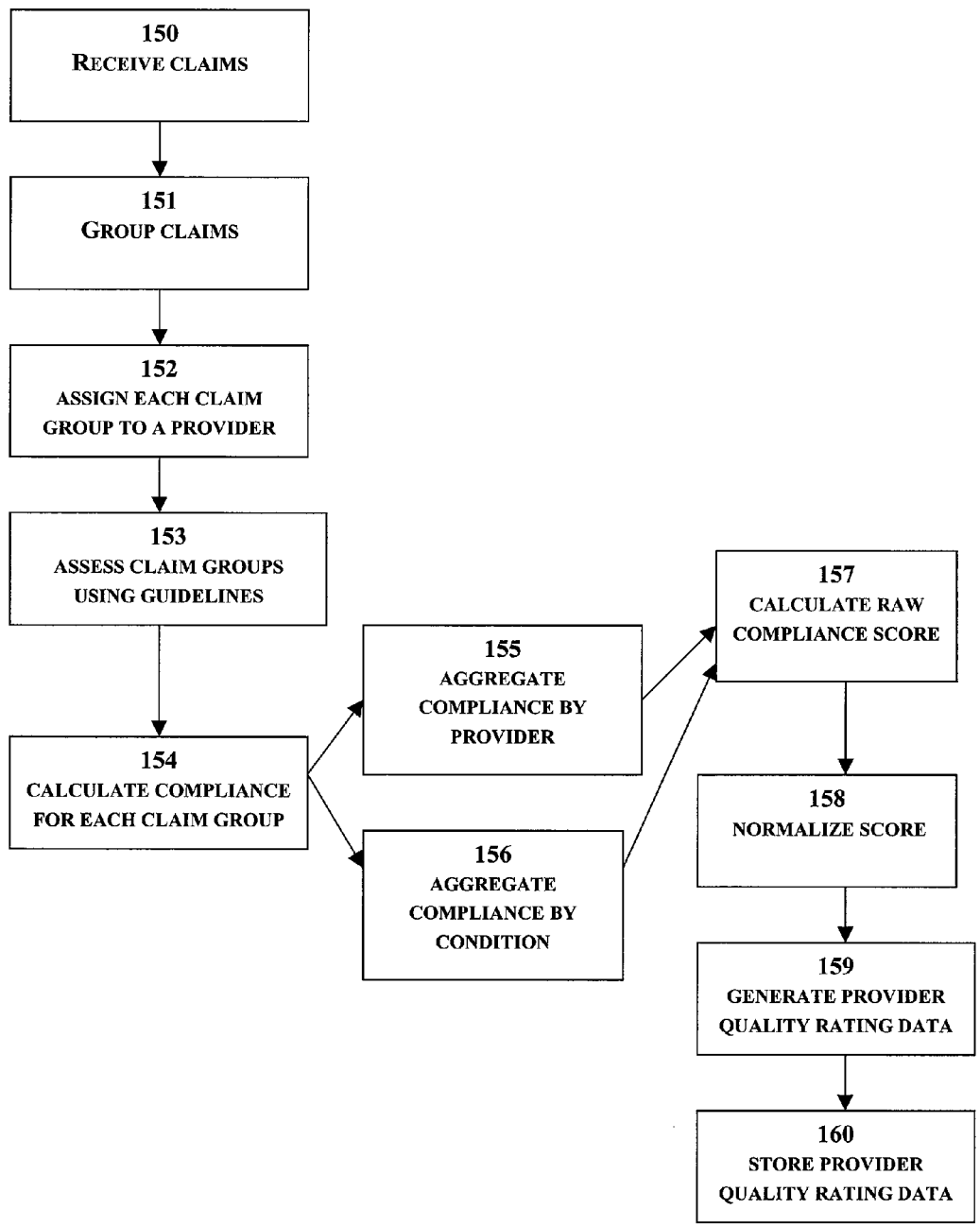
FIG. 1A is a flowchart of a method for generating healthcare provider quality rating data that may be utilized, for example, in the system and method of FIGS. 1C and 1D.

With reference to FIG. 1A, a method for generating healthcare provider quality rating data begins with the receipt (150) of claim data, for example, previously adjudicated claim data associated with a plurality of healthcare providers and a plurality of patients, such as health plan members, for a defined period of time.

Next, the claim data is grouped into units or groupings that can be attributed to a specific healthcare provider (e.g., physician or hospital). Any desired grouping methodology may be implemented.

For example, claim data may be grouped into episodes of care (151), wherein an episode can be defined as a group of related services rendered to a patient to manage a disease condition. An episode may take into account all services provided for a disease condition during a pre-defined period of time and may include office visits, outpatient care, inpatient care, surgeries, laboratory services, radiology, pharmacy, and other related services.

One method of grouping claims into episodes of care using episode treatment groups is described in U.S. Pat. No. 5,835,897, entitled "Computer-Implemented Method for Profiling Medical Claims," and is incorporated herein by reference. Additionally or alternatively, the claim data may be grouped into episodes of case using a grouping methodology such as that disclosed in U.S. patent application Ser. No. 11/369,198, filed Mar. 6, 2006, entitled "Claims Analysis Tools and Method," incorporated herein by reference, in which claims are grouped using anchor and target procedure groups, or U.S. patent application Ser. No. 11/759,616, filed Jun. 7, 2007, now issued as U.S. Pat. No. 7,801,749 on Sep. 21, 2010, entitled "System and Method for Grouping Claims Associated with a Procedure," incorporated herein by reference, in which claims may be grouped using procedure episode groups.

Alternatively, claims may be grouped using an APR-DRG grouper, such as that designed by 3M® Corporation, which assigns a base class to each medical claim based upon the DRG and primary diagnosis codes. The grouper further may assign a severity of illness (SOI) class 1-4 depending on the secondary diagnosis codes and other member characteristics in the claims. The grouper additionally may assign a risk of mortality (ROM) class 1-4 based on the member's risk of dying as inferred from secondary diagnosis codes and demographic information of the member. This grouper may be implemented, to group facility claims attributable to certain healthcare facilities, such as hospitals, to enable computation of quality and/or cost rating data for such facilities in comparison to expected or average values for such facility quality and costs.

The grouping methodology selected to implement 151 above may be selected to group claims in such a way as to enable accurate attribution or assignment of each episode to a specific healthcare provider (as performed in 152, discussed below). Since providers are evaluated based upon the claim groups attributed or assigned to them, claims should be grouped into episodes of care or other groupings that accurately represent the services rendered by the provider to whom each episode of care is assigned. Accordingly, one or more grouping methodologies may be implemented for this purpose.

For example, the procedure episode grouper described in U.S. Pat. No. 7,801,749 (referenced above) may be implemented to group process claim data into specific and discrete procedures, for example, related to one of a plurality of cardiac or musculoskeletal procedures. Examples may include heart transplants, spinal fusions, and hip replacements. Using the procedure episode grouper in conjunction with an episode grouper, specific resource-intensive procedural costs and services can be carved out of the episodes of care into procedure episode groups, leaving the episodes of care to include the medical episodes and their related costs and services. Thus, discrete procedures, such as surgeries, that are performed by a procedure provider, such as a surgeon, are separated from medical episodes, which include services that may be medically related to the surgery but are provided by a different (e.g., non-surgical) provider.

After the claims are grouped as described above, each episode of care or other grouping is analyzed to identify the provider to which the episode is to be attributed or assigned (152). For example, episodes of care may be assigned to providers based upon their degree of involvement in the care for an episode. Thus, performance of the provider may be measured for the treatment provided for the entire continuum of care for a certain disease condition.

In one implementation, an episode of care is attributed to one or more providers using the following rules:

An episode is attributed to all providers responsible for more than 25% of non-facility costs of the episode;

An episode is attributed to all providers associated with a management or surgery record if the provider is responsible for more than 25% of the services within the episode.

Episodes are attributed to all providers meeting either of the above two criteria.

In this example, an episode is attributed to providers if they are responsible for more than 25% of the services or costs of the episode. In this manner, episodes are assigned to providers based upon their involvement in the care for an episode.

Notably, if the claim data received in 150 relates only to one provider, function 152 may be omitted, as all episodes within the received claim data are attributable to the same provider and the assignment process may be unnecessary.

Additionally, the risk associated with each episode optionally may be assessed, for example, by identifying co-morbidities of a patient, in order to generate a risk profile for the patient. The risk profile may include both past and future risk scores for each patient. Each patient's risk score may be used to generate a severity metric for associated providers. A provider's severity metric may be based, for example, on the risk scores for all episodes of all patients treated by the provider, and may be aggregated for the provider and/or assessed on a condition-by-condition basis (e.g., including only episodes associated with one or more specific conditions or diseases).

Once each episode has been assigned to one or more providers, each episode of care is assessed to determine whether the episode of care complies with expected treatment for the disease or condition (153). In one implementation, this is accomplished by using evidence based medicine (EBM), wherein the episodes of care are assessed for consistency with widely accepted guidelines for treatment, for example, using a software application such as EBM Connect™ offered by Ingenix Corp., of Eden Prairie, Minn. The software may indicate under-use or misuse of services based on a series of measures such as those related to disease management, medication adherence and compliance, patient safety, or care patterns.

For example, the following rules may be used for the condition of congestive heart failure:

| Rule Type | Description of Clinical Measure | Requires Action |
|---|---|---|
| | Disease Management | |
| R-1 | Patients currently taking an ACE-inhibitor or acceptable alternative. | X |
| R-1 | Patients currently taking a beta blocker. | |
| R-2 | Patients currently taking spironolactone. | |
| | Medication Adherence | |
| A | Patients compliant with prescribed ACE-inhibitor or acceptable alternative. | |
| A | Patients compliant with prescribed beta blocker. | X |
| A | Patients compliant with prescribed spironolactone. | X |
| A | Patients compliant with prescribed digoxin. | |
| | Patient Safety | |
| S-M | Patients taking medication that had serum potassium (K+) test. | |
| S-M | Patients taking medication that had serum creatinine (Cr) test. | |
| S-M | Patients currently taking digoxin that had a serum digoxin test in the last 24 months. | |
| S-M | Patients currently taking digoxin that had serum creatinine (Cr) test. | |
| S-M | Patients currently taking digoxin that had serum potassium (K⁺) test. | |
| S-DI | Patients currently taking contraindicated medication. | |
| S-DI | Patients currently taking contraindicated medication. | X |
| | Care Patterns | |
| CP-C | Patients with more than one echocardiogram in the past year (excluding patients with a diagnosis of unstable angina or patients admitted for an AMI). | X |
| CP-I | Patients with an annual physician assessment. | |
| CP-I | Patients with indications that had a Cardiology consultation. | |

The software application may identify patients with selected clinical conditions and evaluate particular aspects of their care by applying clinical rules to identify whether treatments did or did not occur (referred to as gaps in care).

Dr. Jones
Patients being treated for the condition of:
Asthma
Mary Smith    Age 50    Gender F

| | Result Flag | Date last Relevant Service |
|---|---|---|
| Patients with presumed persistent asthma using an inhaled corticosteroid | Y | Apr. 9, 2003 |
| Patient using inhaled long-acting beta2-agonist also using inhaled corticosteroid in past 3 months | N | Apr. 9, 2003 |
| Patient on leukotriene modifier >90 days w/possession ratio >70% in past 6 months | Y | Dec. 29, 2003 |
| Patient on theophylline >90 days w/possession ratio >70% in past 6 months | N/A | N/R |
| Patients on theophylline had an annual serum theophylline level. | N/A | N/R |
| Patient on zyflo medication had serum ALT or AST in the past year | N/A | N/R |
| Patient had an office visit for asthma in past 6 months | Y | Aug. 6, 2003 |
| Patients frequently using short-acting beta2-agonist inhalers that had an office visit in the past 3 months. | N | Aug. 6, 2003 |
| Patient exhibiting poor control of asthma seen by allergist or pulmonologist in past year | N | N/R |
| Patients that had a PFT | N | N/R |

All of the applicable rules for a physician's patients may be aggregated as follows to generate a compliance score for the provider (154):

Dr Jones

| | Congestive Heart Failure (CHF) Number of Patients = 10 | | | |
|---|---|---|---|---|
| Rule Type | Description of Clinical Measure | Compliant | Eligible | Compliance Rate |
| R-1 | Patients currently taking an ACE-inhibitor or acceptable alternative. | 8 | 10 | 80% |
| R-1 | Patients currently taking a beta blocker. | 6 | 10 | 60% |
| R-2 | Patients currently taking spironolactone. | 4 | 10 | 40% |
| A | Patients compliant with prescribed ACE-inhibitor or acceptable alternative. | 7 | 8 | 88% |
| A | Patients compliant with prescribed beta blocker. | 6 | 6 | 100% |
| A | Patients compliant with prescribed spironolactone. | 3 | 4 | 75% |
| A | Patients compliant with prescribed digoxin. | 2 | 3 | 67% |
| S-M | Patients taking medication that had serum potassium (K+) test. | 6 | 9 | 67% |
| S-M | Patients taking medication that had serum creatinine (Cr) test. | 6 | 9 | 67% |
| S-M | Patients currently taking digoxin that had a serum digoxin test in the last 24 months. | 2 | 3 | 67% |
| S-M | Patients currently taking digoxin that had serum creatinine (Cr) test. | 3 | 3 | 100% |
| S-M | Patients currently taking digoxin that had serum potassium (K+) test. | 3 | 3 | 100% |
| S-DI | Patients currently taking contraindicated medication. | 1 | 10 | 10% |
| S-DI | Patients currently taking contraindicated medication. | 1 | 10 | 10% |
| CP-C | Patients with more than one echocardiogram in the past year (excluding patients with a diagnosis of unstable angina or patients admitted for an AMI). | 4 | 8 | 50% |
| CP-I | Patients with an annual physician assessment. | 8 | 10 | 80% |
| CP-I | Patients with indications that had a Cardiology consultation. | 2 | 2 | 100% |

A comprehensive EBM score may be generated for each physician after weighing each rule by its relative importance. An exemplary table of EBM rule weighting is as follows:

| Weight | Condition | Report Rule Id | RuleDescription |
|---|---|---|---|
| 2 | Congestive Heart Failure | 9136001 | Patient(s) currently taking an ACE-inhibitor or acceptable alternative. |
| 2 | Congestive Heart Failure | 9136002 | Patient(s) currently taking a beta-blocker. |
| 0 | Congestive Heart Failure | 9136003 | Patient(s) currently taking spironolactone. |
| 0 | Congestive Heart Failure | 9137004 | Patient(s) compliant with prescribed ACE-inhibitor or acceptable alt. |
| 0 | Congestive Heart Failure | 9137005 | Patient(s) compliant with prescribed beta-blocker. |
| 0 | Congestive Heart Failure | 9137006 | Patient(s) compliant with prescribed spironolactone. |
| 0 | Congestive Heart Failure | 9137007 | Patient(s) compliant with prescribed digoxin. |
| 2 | Congestive Heart Failure | 9138008 | Patient(s) taking ACE-inhibitors, angiotensin receptor blockers or spironolactone. |
| 2 | Congestive Heart Failure | 9138009 | Patient(s) taking ACE-inhibitors, angiotensin receptor blockers or spironolactone. |
| 2 | Congestive Heart Failure | 9138010 | Patient(s) taking digoxin that had a serum digoxin test in last 24 reported months. |
| 2 | Congestive Heart Failure | 9138011 | Patient(s) taking digoxin that had a serum potassium test in last 12 reported months. |
| 2 | Congestive Heart Failure | 9138012 | Patient(s) taking digoxin that had a serum creatinine test in last 12 reported months. |
| 1 | Congestive Heart Failure | 9138013 | Patient(s) taking contraindicated NSAID medication. |
| 2 | Congestive Heart Failure | 9138014 | Patient(s) taking contraindicated Class I anti-arrhythmic medication. |
| 1 | Congestive Heart Failure | 9139015 | Patient(s) with more than 1 echocardiogram in last reported 12 months. |
| 2 | Congestive Heart Failure | 9139016 | Patient(s) having an annual physical assessment. |
| 2 | Congestive Heart Failure | 9139017 | Patient(s) with indications that had a cardiology consult in last 24 reported months. |

The EBM software may rate providers on their adherence to guidelines and provide an EBM score that can be compared directly with EBM scores of other providers, and/or with state averages. The EBM score may further be used to generate provider quality rating data, as discussed below in detail.

In particular, the compliance scores for each episode of care may be aggregated on the provider level (155) and also on the condition level for each provider (156). In other words, an aggregate provider score may be calculated as the average of all compliance scores for the episodes assigned to the provider, regardless of condition. Compliance scores aggregated at the condition level may be calculated as the average of all compliance scores received by the provider for episodes associated with a specific condition. Compliance scores may be risk adjusted, for example using patients' risk profiles, so that each provider's compliance sores are compared to those of peers treating similar episodic conditions.

Based upon the aggregate compliance scores, a raw quality score may be calculated (157) for a provider, both overall and by condition. The raw quality score may be the EBM compliance score, or may be a weighted sum of the EBM compliance score and other factors or utilization measures, which may be risk adjusted, for example, using the patient's risk profile discussed above. Alternatively, if there is no EBM score, for example, when there are no EBM criteria with which to assess a given episode of care, other utilization measures may be assessed and weighted to generate a raw quality score.

For example, in one implementation, the raw quality score is calculated as the weighted sum of a provider's EBM compliance score, and three utilization measures: risk-adjusted inpatient days per year (I), risk-adjusted emergency room visits per year (E), and risk-adjusted outlier cost (O) (for example, representing the number of potentially avoidable procedures) as follows:

Raw quality score=0.7 (EBM compliance score)+0.1 (I)+0.1(E)+0.1(O)

If there is no EBM score for a given episode of care, a raw quality score for the episode may be generated by providing a weighted sum of the I, E, and O utilization measures.

In an alternative implementation that may be utilized, for example, when the provider is a facility such as a hospital and no EBM score is obtained, the raw quality score may be calculated as the weighted sum of four utilization measures obtained using in-patient and/or out-patient facility claims attributed to the provider: death rate (D), complication rate (C), length of stay (L), and risk-adjusted avoidable days (A) (for example, representing the number of potentially avoidable days) as follows:

Raw quality score=0.35(D)+0.3(C)+0.2(L)+0.15(A)

Once calculated, for example, using one of the formulae described above, the raw quality score then may be adjusted and normalized (158). For example, the raw score may be adjusted based upon the average or expected value based on specialty, presence of pharmacy claims, geographical location, and/or type of disease or condition. The adjusted score may then be normalized, for example, to a scale of 0-100. The normalized score may then be used to generate quality rating data for the provider (159), either overall, by condition, or both.

For example, if a normalized scale of 0-100 is used, provider quality rating data may be generated according to the following rules:

| Score | Rating |
|---|---|
| >95 | Significantly above average |
| 75-94 | Above average |
| 25-74 | Average |
| <25 | Below average |

In this example, quality rating data includes an assigned performance category that indicates each provider's quality of treatment in comparison to other providers.

Alternatively, provider quality rating data may be generated according to the following rules:

| Score | Rating |
|---|---|
| 95-100 | ***** |
| 75-94 | **** |
| 50-74 | *** |
| 25-49 | ** |
| 0-24 | * |

In this example, quality rating data includes an assigned graphic representation that indicates each provider's quality of treatment in comparison to other providers.

Alternatively, any desired rating categories, scores and definitions may be implemented.

The provider quality rating data as well as the underlying EBM compliance score and other factors utilized in the method described above with reference to 150-159 may be stored (160) for access by users of a consumer guide (described below with reference to FIGS. 1C and 1D), health plan administrators, data analysts, and other desired users.

Norms that may be utilized, for example, for developing expected values, for risk adjustment and/or for standardizing risk-adjusted values, may be developed as follows with reference to episodes of care and associated episode treatment groups (ETGs), which are categories that may be utilized to group claim records into episodes of care.

Episodes are assigned to providers, such as physicians, based upon their degree of involvement in the care included in the episode (as discussed above). Average performance of physicians may then be calculated for each measure for each geographical region (e.g., state) using the information from all similar types of physicians in the region treating similar conditions after adjusting for outliers. For example, the performance of a primary care physician (PCP) may be compared with that of an average PCP, and a PCP treating diabetes may be compared with an average PCP treating diabetes.

For example, average costs may be developed for each ETG, for each physician specialty, and based upon whether the physician has associated pharmacy benefits as follows:

| ETG | Specialty Description | Pharm Ind | Episode Count (Aftr Outlrs) | Avg Cost |
|---|---|---|---|---|
| 0027 | INTERNIST | N | 413 | 887.03 |
| 0027 | INTERNIST | Y | 357 | 2,319.77 |
| 0027 | FAM/GEN/PRIM CARE | N | 386 | 866.68 |
| 0027 | FAM/GEN/PRIM CARE | Y | 343 | 1,882.82 |
| 0027 | ENDOCRINOLOGIST | N | 234 | 782.95 |
| 0027 | ENDOCRINOLOGIST | Y | 230 | 2,645.49 |
| 0027 | EMERGENCY MEDICINE | N | 65 | 2,025.22 |
| 0027 | EMERGENCY MEDICINE | Y | 33 | 4,895.07 |
| 0027 | CARDIOLOGIST | N | 31 | 1,780.37 |
| 0027 | CARDIOLOGIST | Y | 17 | 3,384.51 |
| 0027 | NEPHROLOGIST | N | 14 | 4,744.79 |
| 0027 | NEPHROLOGIST | Y | 29 | 7,789.86 |

Average values calculated using the normative database are used to develop expected values for each performance metric for physicians and for the purposes of risk adjustment, based upon physician specialty type, mix of episodes, and pharmacy benefits.

Figure 1B:
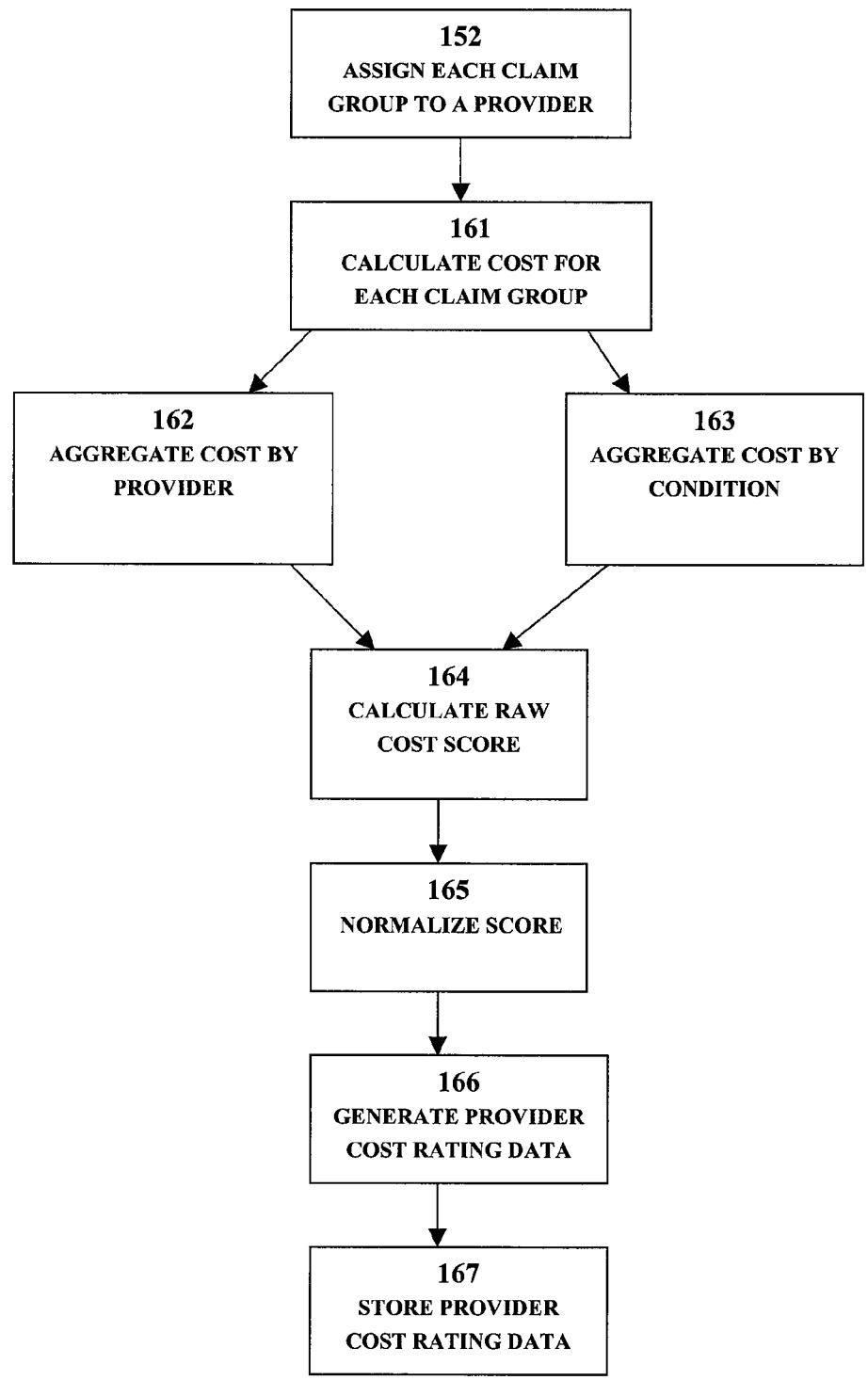
FIG. 1B is a flowchart of a method for generating healthcare provider cost rating data that may be utilized, for example, by the system and method of FIGS. 1B and 1D.

With reference to FIG. 1B, a method for generating provider cost rating data follows the functionality described with reference to 150-152 of FIG. 1A. As with the method of FIG. 1A, if the claim data received in 150 relates only to one provider, function 152 may be omitted, as all episodes or claim groups within the received claim data are attributable to the same provider such that the assignment function may not be necessary. After episodes or claim groups have been assigned to a provider (152), the cost of each episode or claim group is calculated (161). The cost may be the total allowed claim amounts for the entire episode of care of claim group. This may include the health plan's reimbursement along with the patient's portion, including co-payments and deductibles. Costs may be aggregated by all provider episodes and separately for each condition treated. Costs may be risk adjusted, for example using patients' risk profiles, to account for higher costs in sicker patients. Risk adjusted costs may be compared to those of peers treating similar episodic conditions.

The costs are then aggregated by provider (162) and/or condition (163) to determine each provider's observed costs for all treatments rendered by the provider and/or each condition or disease treated by the provider. Each provider's observed costs are then compared with expected costs for an average provider based on specialty, presence of pharmacy claims, and geographical location (e.g., same state) to generate a raw cost score for the provider overall and/or for each condition treated by the provider (164).

The raw costs score for each provider for each condition treated may then be normalized (165) using the geographical (e.g., state) average to calculate the risk-adjusted costs. Each provider's risk-adjusted costs are compared with average costs to generate cost rating data (166) for each provider (for all conditions and/or on a condition-by-condition basis), for example using the same scale of 0-100 and ratings described above with reference to 159 in FIG. 1A. The cost rating data may be stored (167) and accessed by users of a consumer guide, health plan administrators, data analysts, and other desired users. In one example in which both quality and cost rating data has been generated, the stored quality and cost data may be utilized to research and analyze correlations between provider cost and quality.

In one implementation, provider cost rating data may be generated as follows. The expected value for provider costs may be the average cost that would result if the provider's mix of patients by severity level had been treated at the average cost in a reference normative database. An individual provider's expected costs may be derived using norms tables depending on the specialty type for the various conditions treated. For example, if an internist treats twenty-five episodes of hypertension in the state of Kentucky (KY), the expected costs for this condition would be based on the distribution of episodes of high blood pressure within the condition "hypertension." These costs may be derived from the norms tables for hypertension for Kentucky as shown below:

|  |  | Internist | |
|---|---|---|---|
| M0507 | High Blood Pressure, Hypertension | Pharmacy No | Pharmacy Yes |
| 0278 | Malignant hypertension, with comorbidity | $1,127 | $1,343 |
| 0279 | Malignant hypertension, w/o comorbidity | $569 | $862 |
| 0280 | Benign hypertension, with comorbidity | $597 | $698 |
| 0281 | Benign hypertension, w/o comorbidity | $375 | $605 |

Therefore, the internist's expected costs would be derived as follows:

| Pharmacy | Episode | Volume | Cost |
|---|---|---|---|
| No | Malignant hypertension, with comorbidity | 0 | $0 |
| Yes | Malignant hypertension, with comorbidity | 2 | $2,687 |
| No | Malignant hypertension, w/o comorbidity | 1 | $569 |
| Yes | Malignant hypertension, w/o comorbidity | 3 | $2,586 |
| No | Benign hypertension, with comorbidity | 5 | $2,985 |
| Yes | Benign hypertension, with comorbidity | 8 | $5,583 |
| No | Benign hypertension, w/o comorbidity | 4 | $1,501 |
| Yes | Benign hypertension, w/o comorbidity | 2 | $1,210 |
|  |  | 25 | $17,120 |
|  |  | Expected Costs | $685 |

This method allows for risk-adjustment by provider type, episode type, and presence or absence of pharmacy benefits. The provider's observed costs for treating hypertension ($1,159 in the above example) are compared with expected costs ($685 as calculated above) to create a performance index that is normalized using the state average for treating hypertension ($466 for KY) to calculate the risk-adjusted cost ($789). A provider's risk-adjusted costs may be compared directly across all providers, who have been normalized against the same state average.

While the example given above is for a single condition, the computation may be expanded to include multiple conditions or the entire practice of the provider. In the following example, risk-adjusted costs are calculated for an internist in KY for each condition treated based upon expected costs for the mix of patients within each condition derived from the normative database. These values are compared with their state norms, and ratings are calculated:

| Condition Code | Condition Name | Volume | Risk-Adjusted Cost | Norms |
|---|---|---|---|---|
| M0507 | High Blood Pressure, Hypertension | 25 | $789 | $466 |
| M0508 | Hyperlipidemia | 14 | $424 | $436 |
| M1001 | Diabetes | 11 | $1,521 | $1,069 |
| M0808 | Musculoskeletal Problems | 9 | $483 | $289 |
| M1002 | Goiter, Thyroid Problems, Thyroid Cancer | 8 | $643 | $402 |
| M2501 | Immunizations, Preventive Services, Checkups | 6 | $263 | $173 |
| M0303 | Acute sinusitis | 5 | $179 | $189 |
| M0903 | Skin Infection, Cellulitis | 5 | $162 | $175 |
| M1903 | Minor Depression | 5 | $805 | $502 |

As illustrated above, to compare the performance of providers, a severity-adjusted value for each provider is computed and standardized using a geographic standard. Thus, for a given condition, the physician's costs are computed after being adjusted for severity of patients treated, based on the mix of ETGs within the condition. Then, the risk-adjusted costs are compared against a constant reference value, which represents the average costs for the given condition in a given geographical area. This comparison may be utilized to generate cost rating data for each provider.

In one implementation, the distance of the risk-adjusted costs from the average costs is calculated, and a z-score and p-value to adjust for volume differences amongst physicians are statistically calculated. Weighted standard deviation calculations are used to keep within-physician variances constant while adjusting for differences in volume and variations across physicians. P-values may then be converted to a 0-100 scale and presented as a star, gauge or other cost rating.

Figure 1C:
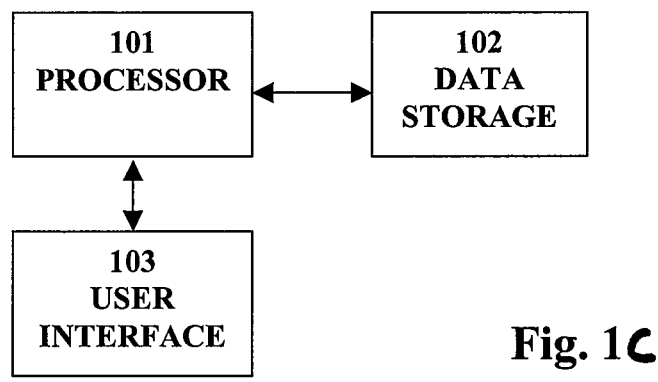
FIG. 1C is a diagram of an exemplary system for providing a consumer healthcare guide that enables consumers to access provider quality and/or cost rating data generated by the methods of FIGS. 1A and/or 1B.

FIG. 1C is a diagram of an exemplary system for providing a consumer healthcare guide, such as a web-based provider lookup tool, that may be implemented to enable consumer access to provider quality and/or cost rating data generated by the methods described above with reference to FIGS. 1A and 1B. The exemplary system includes a processor 101 and data storage 102. The processor 101 is configured to receive search criteria, and retrieve one or more health-related listings based on the search criteria, in which the health-related listing includes associated provider quality rating data and/or cost rating data. Data storage 102 is configured for storing health-related data and is communicatively coupled to the processor 101 to enable the processor to retrieve health-related data. Health-related data may include provider information listings (including physicians, hospitals and other providers) and associated provider quality rating data and provider cost rating data retrieved from data storage 102. A graphical user interface or other user interface 103 may be provided that is communicatively with processor 101 and/or storage 102 for facilitating user access to the health-related data.

Figure 1D:
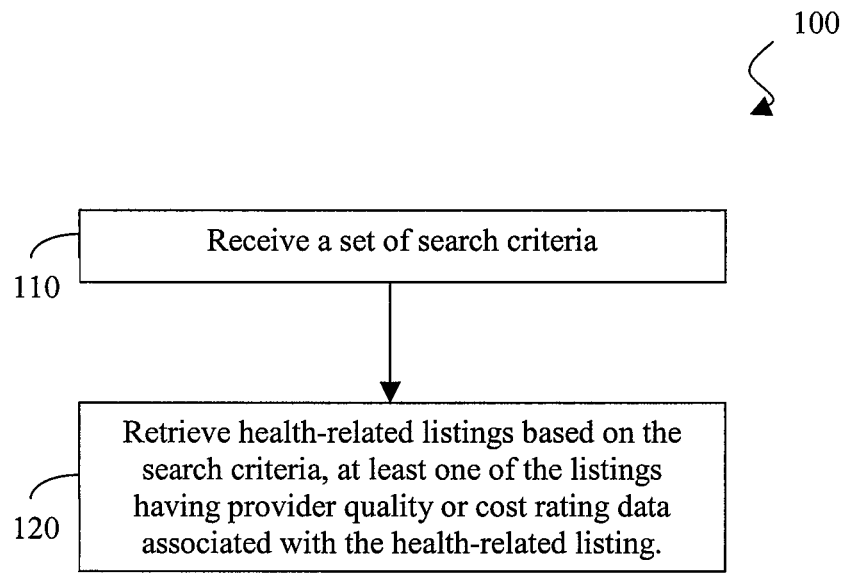
FIG. 1D is a flowchart of a method for providing the consumer healthcare guide of FIG. 1C.

FIG. 1D is a flowchart of a method 100 for providing a consumer healthcare guide, such as that illustrated in FIG. 1C. Method 100 includes receiving 110 search criteria, and retrieving 120 one or more health-related listings based on the search criteria. Search criteria may be entered by a consumer, such as a member of an insurance plan, and may include search data such as the name or type (specialty) of provider sought and a geographical area of search.

Search criteria may be entered by a user, wherein the user selects, for example, a specific geographical location and specific type of provider or service desired. In this example, the user may select to view data concerning all healthcare providers in the selected area that provide the desired service or procedure.

In response to a search request entered by the user such as described above, the processor 101 generates a graphic user interface to display a consumer healthcare guide including provider rating data. Providers may include doctors and other providers of health-related services, as well as facilities including hospitals, clinics and other facilities at which health-related services are provided. The provider rating data may include relative rating information concerning the cost and/or quality for each provider. Other data also may be displayed as desired by the implementers of the system and/or the user.

Cost and quality rating data associated with a consumer healthcare guide may be displayed, for example, as a discrete cost rating and quality rating for each provider meeting the search criteria input by the user. For example, a cost rating may be a "$" rating, e.g., one $ as the lowest rating and three $$$ as the highest rating, and a quality rating may be a star rating "★", e.g., one star ★ as the lowest rating and three stars ★★★ as the highest rating. Alternatively, a graphic image, such as a gauge similar to a temperature gauge that indicates the relative ratings of providers, may be displayed. Cost rating information may also include relative cost, e.g., a cost percentage difference from the marketplace, and/or average costs. In addition, a consumer reviewing quality and cost data related to health-related data may also review the underlying measures driving quality and cost ratings. For the consumer healthcare guide, quality and cost data may be provided about health-related services and providers for a number of inpatient and outpatient procedures and/or medical conditions. However, it should be understood that cost and quality information may be represented or displayed in any way, and that the performance categories, "$" rating, star rating, and gauge rating display are exemplary implementations of communicating relative provider cost and quality ratings displayed via a consumer guide. Furthermore, additional data relevant to a consumer's healthcare choice may be presented to a user in addition to or as an alternative to cost and quality data.

The guide may further display provider volume data, including such information as the number of procedures (overall and/or specific procedures) performed by each provider, patient age ranges, patient gender information (such as number or percentage of male and female patients), and/or top conditions treated or procedures performed by each provider, also may be displayed by the guide. The displayed number of procedures for each provider may be generated by counting the number of each type of procedure or medical episode attributed to each provider. Patient age range information and gender information may be determined based upon the patient age or gender information included in the claim data associated with each procedure or episode attributed to each provider. The top condition(s) information may be determined by counting the number of various procedures or services provided or conditions treated by the provider and identifying one or more most commonly performed procedures or services, or conditions treated, by each provider. In one example, this provider volume data may assist guide users to search for and identify providers that routinely treat a particular condition or perform a procedure or service of interest. The information further may enable guide users to search for and identify providers that routinely treat patients in their age and/or gender category.

FIGS. 2-16 depict exemplary displays associated with a web-based provider lookup tool that enables user access to physician and hospital quality and cost ratings as well as other information that may be relevant to the user in selecting a physician. FIGS. 2-6 depict displays of aggregate physician rating data (relating to all episodes assigned to each physician), while FIGS. 7-10 depict displays of physician rating data associated with a selected condition or disease (diabetes in this instance). FIGS. 11-12 display sanction information relating to a selected physician. FIGS. 13-16 depict displays relating to hospital quality and cost rating data.

Figure 2:
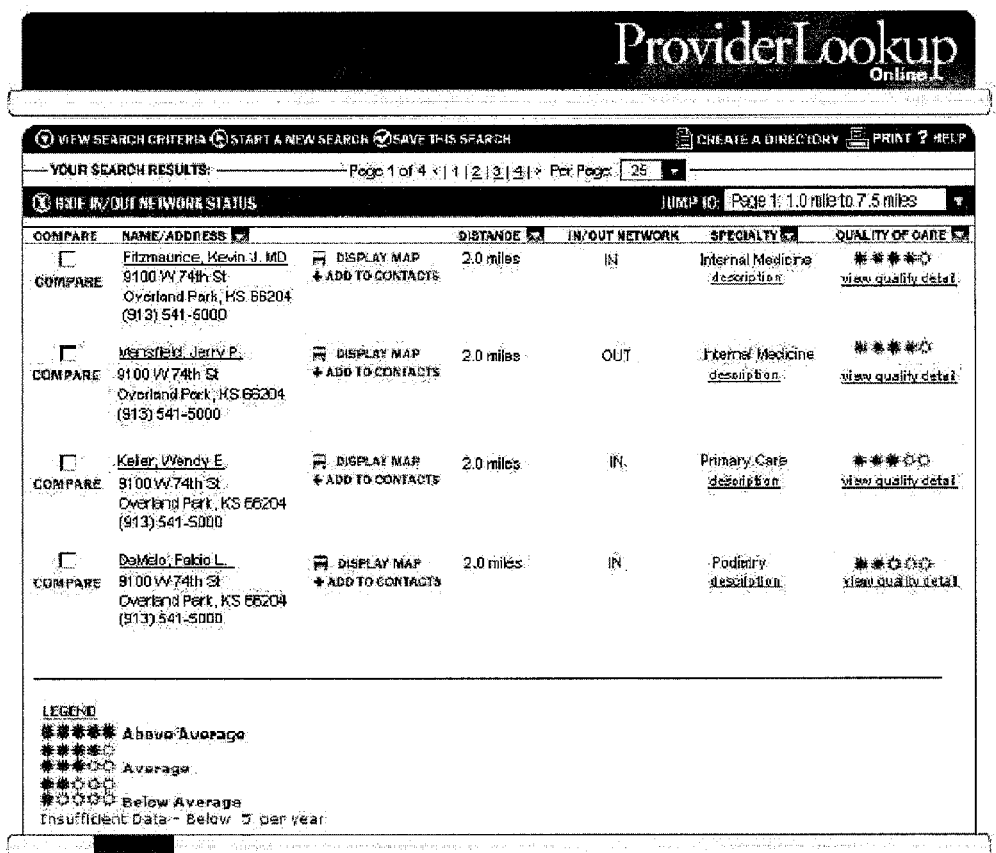

FIG. 2 depicts a user interface displaying the results of an initial search for providers in a selected geographical location. The listings are sorted by physician quality.

Figure 3:
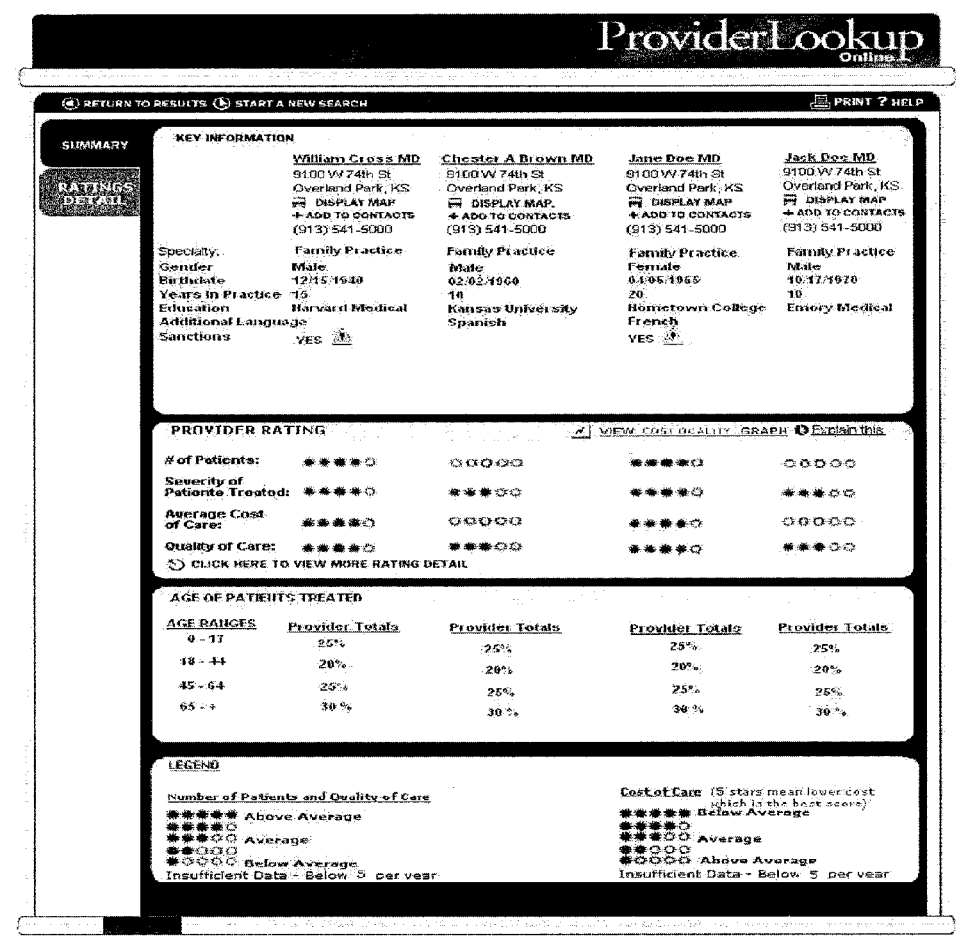

FIG. 3 depicts a user interface in which a number of physicians, for example, selected from the list provided in FIG. 2, can be compared for their overall performance based upon all conditions they treat. The information provided includes information about each provider (name, address, specialty, gender, birth date, years of practice, education, languages, and sanctions); provider rating data, including a rating of severity of patients treated, average cost of care, and quality of care; the age of patients treated by range and percentage; and a legend to assist the user in interpreting the provider rating data.

Figure 4:
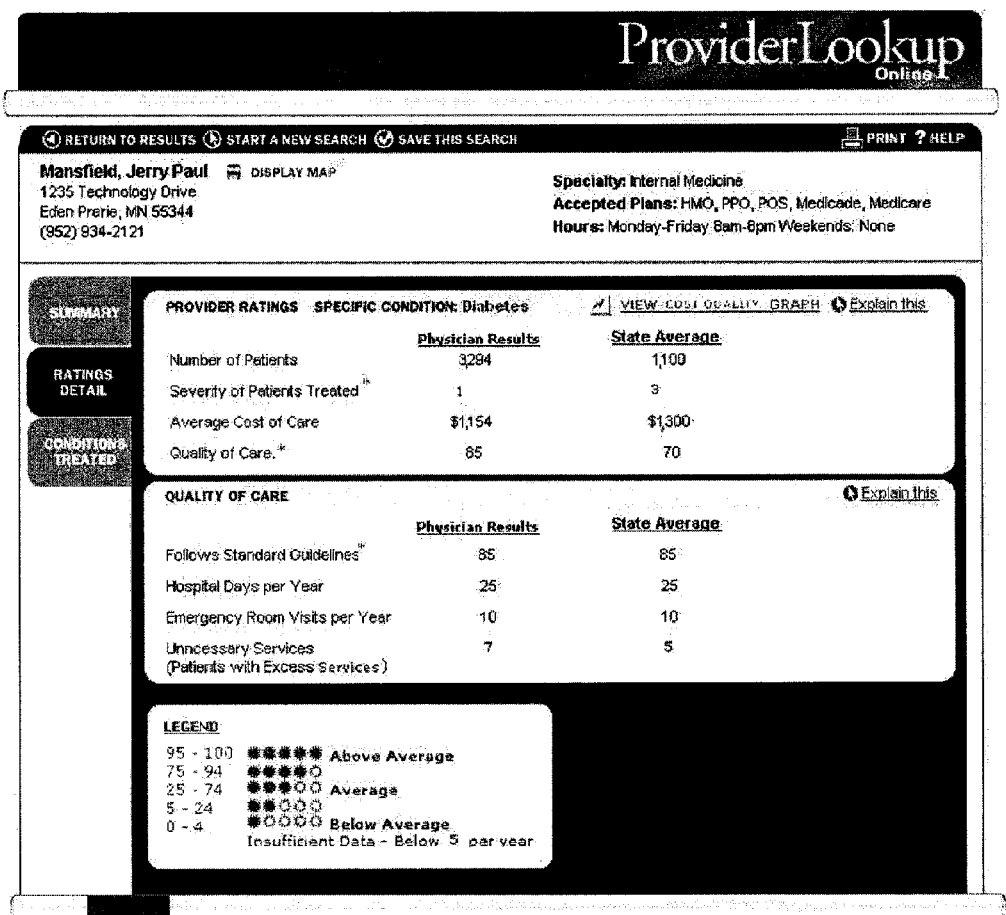

FIG. 4 depicts a display of additional details underlying the provider rating data displayed for a selected provider in FIG. 3. Provider rating details include the number of patients, severity of patients treated, average cost of care, and quality of care as compared to state average values. The provider's quality of care details includes the provider's compliance with standard guidelines, number of patient hospital days per year, number of patient emergency room visits per year, and number of patients with excess services (unnecessary services) as compared to average state values.

Figure 5:
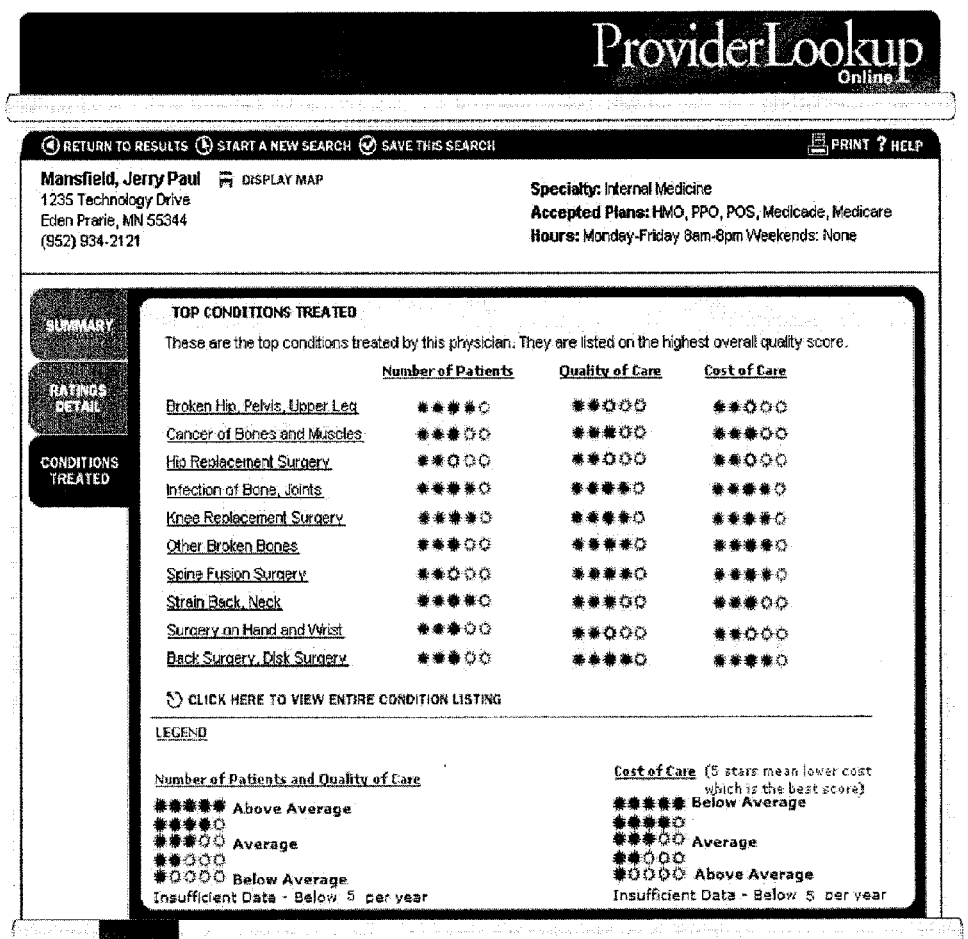

FIG. 5 depicts a display of the top conditions treated by a selected provider, including rating data on the number of patients, quality of care and cost of care for each condition.

Figure 6:
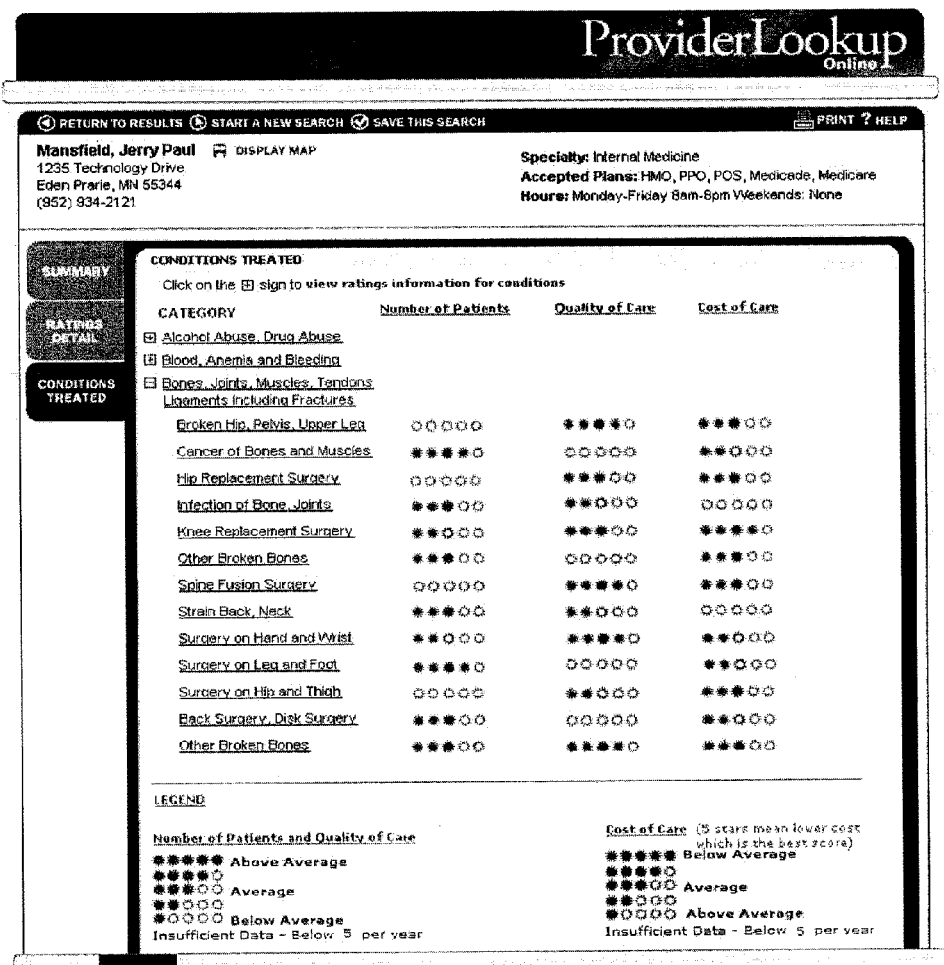

FIG. 6 depicts a display of the top conditions treated by a provider within a specific category of conditions, including rating data on the number of patients, quality of care and cost of care for each condition.

Figure 7:

FIG. 7 depicts a user interface that enables a user to perform an advanced search for providers wherein a category or condition may be specified. In one implementation, patient age range preferences and/or gender percentage treatment preferences may optionally be entered as search criteria.

Figure 8:
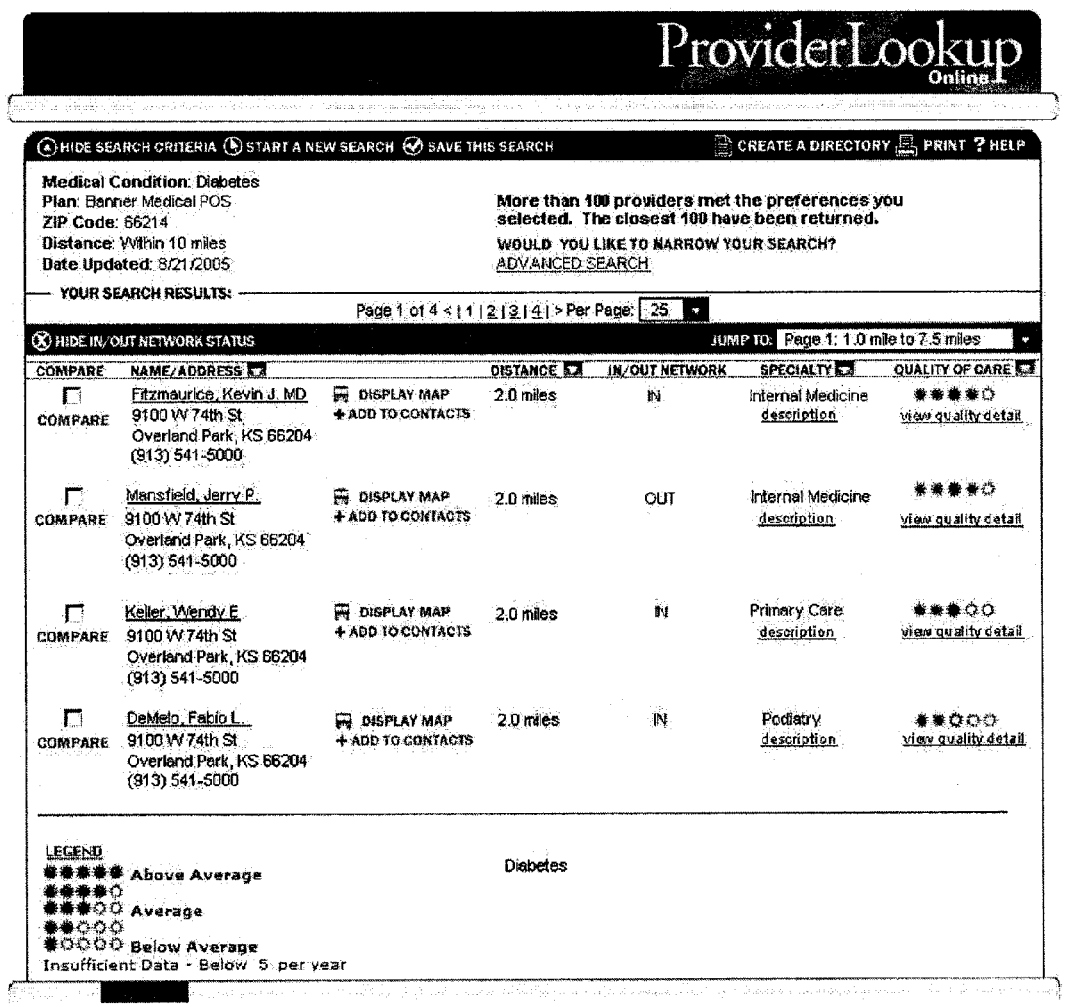

FIG. 8 depicts a display of the search results requested using the interface of FIG. 7, wherein the condition specified is Diabetes and the physicians are listed by quality rating.

Figure 9:
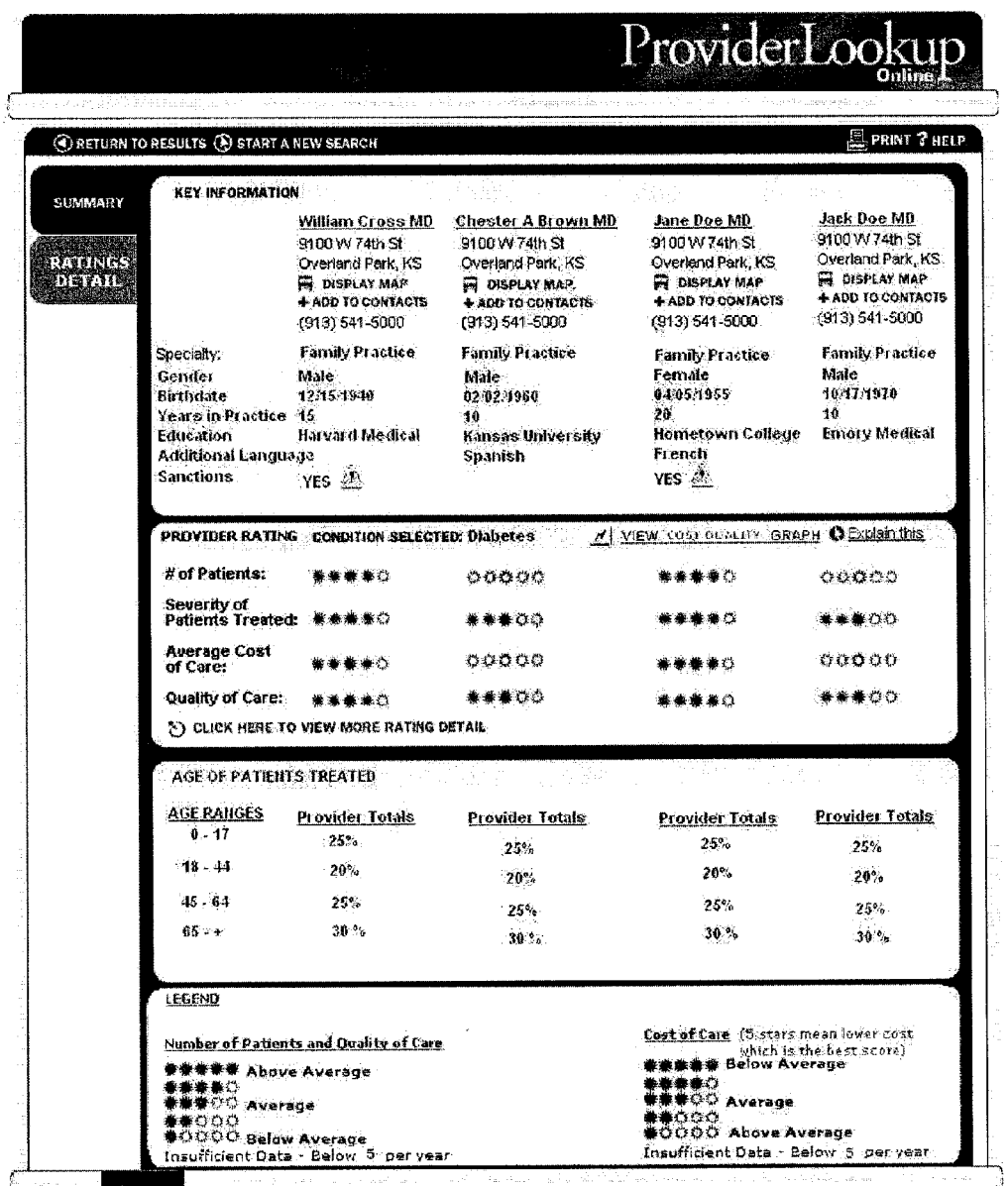

FIG. 9 depicts a display of comparisons of physicians selected from the list displayed in FIG. 8 for the specific condition (e.g. diabetes). The information provided includes information about each provider (name, address, specialty, gender, birth date, years of practice, education, languages, and sanctions); provider rating data, including a rating of severity of patients treated, average cost of care, and quality of care; the age of patients treated by range and percentage; and a legend to assist the user in interpreting the provider rating data.

Figure 10:
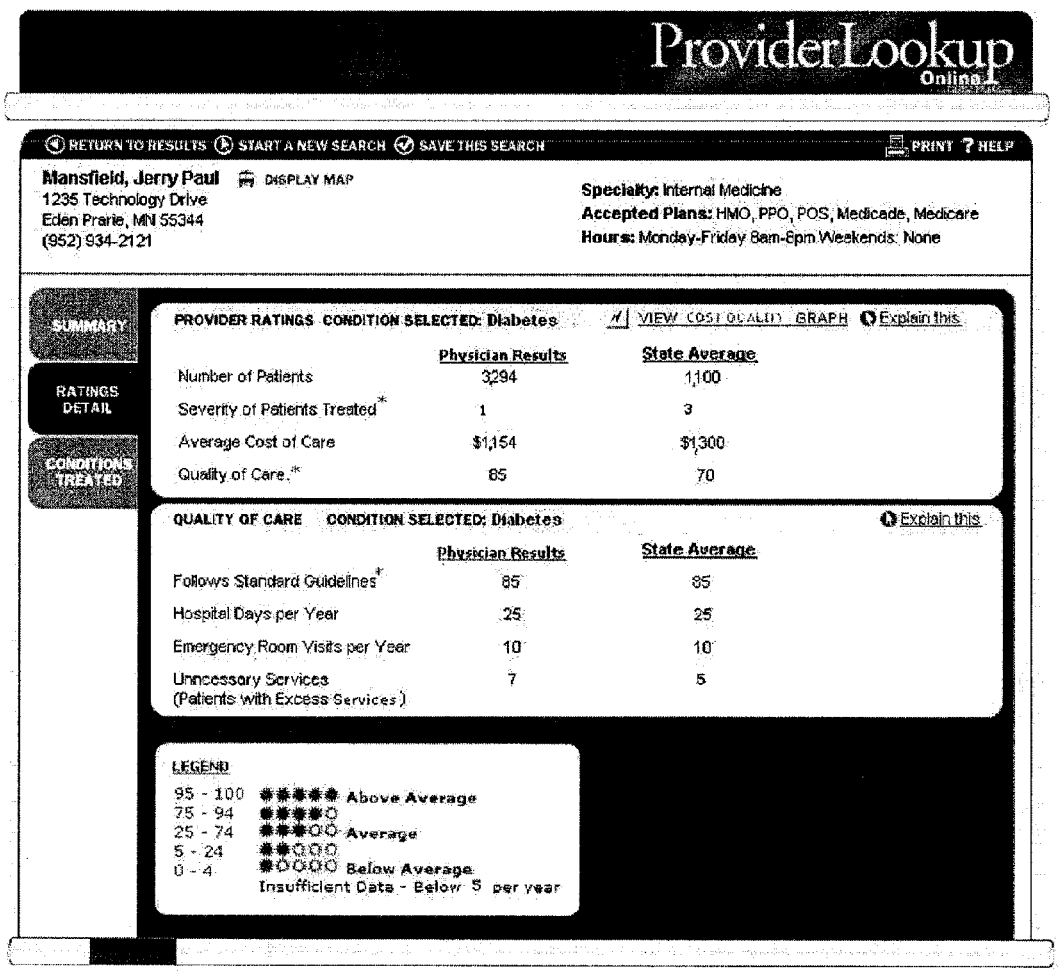

FIG. 10 depicts a display of additional details underlying the provider rating data displayed for a selected provider in FIG. 9. Provider rating details include the number of patients, severity of patients treated, average cost of care, and quality of care as compared to state average values for the selected condition (diabetes). The provider's quality of care details includes the provider's compliance with standard guidelines, number of patient hospital days per year, number of patient emergency room visits per year, and number of patients with excess services (unnecessary services) as compared to average state values for the selected condition.

FIGS. 11 and 12 depict optional displays that may be generated by the consumer guide in which sanction information is displayed relating to a selected physician. An optional list of sanctions is provided in FIG. 11, and optional details of a particular sanction selected from the list in FIG. 11 are provided in FIG. 12.

Figure 14:
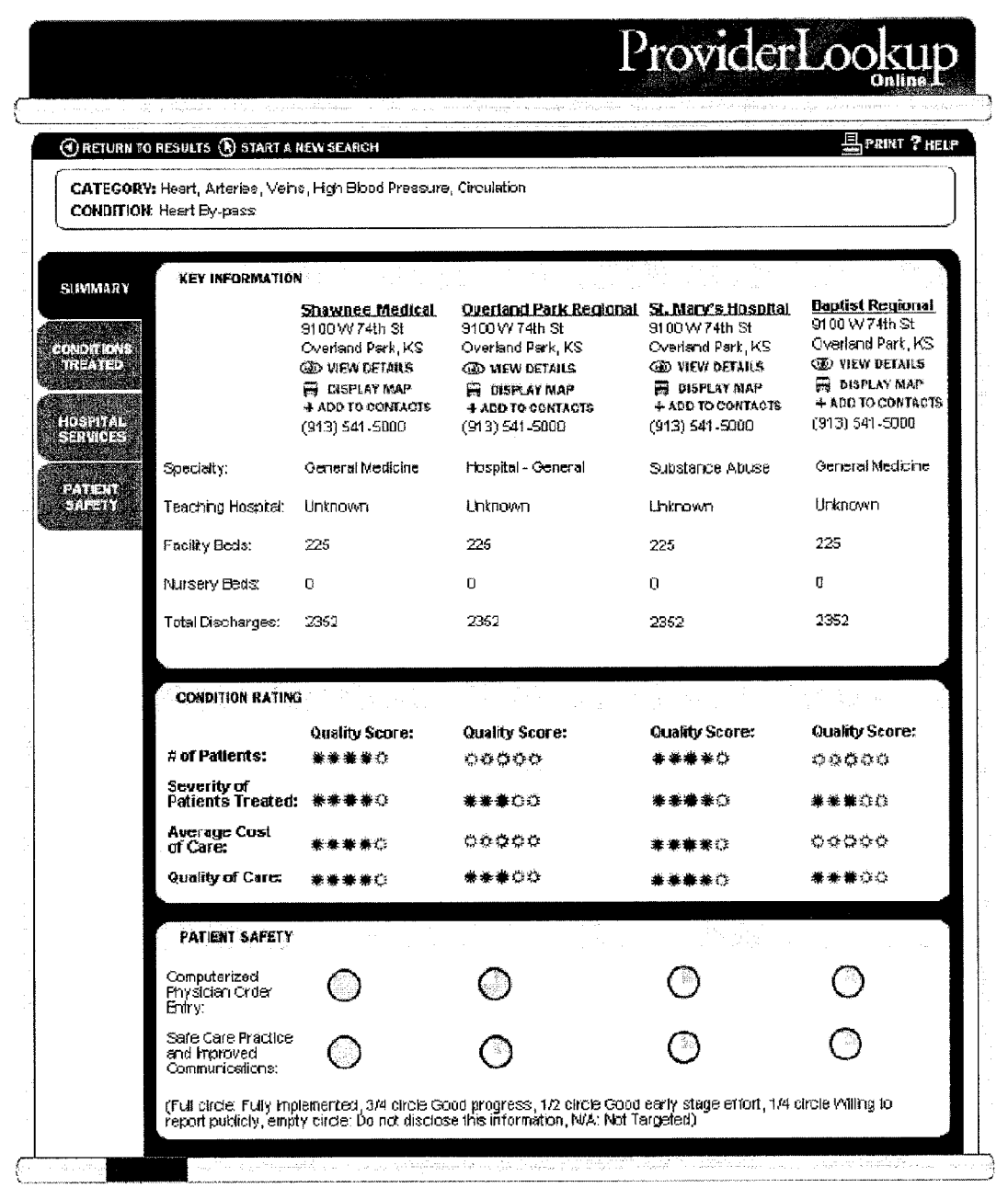

FIG. 13 depicts a display a user interface displaying the results of an initial search for hospitals in a selected geographical location. The listings may be sorted by hospital quality. An "Add to Compare" function, accessed by clicking this option next to one or more of the listed hospitals, adds the selected hospital to a group of hospitals for which a user can make a side-by-side comparison regarding a selected medical condition. FIG. 14 depicts an exemplary side-by-side comparison of four hospitals.

Figure 15:
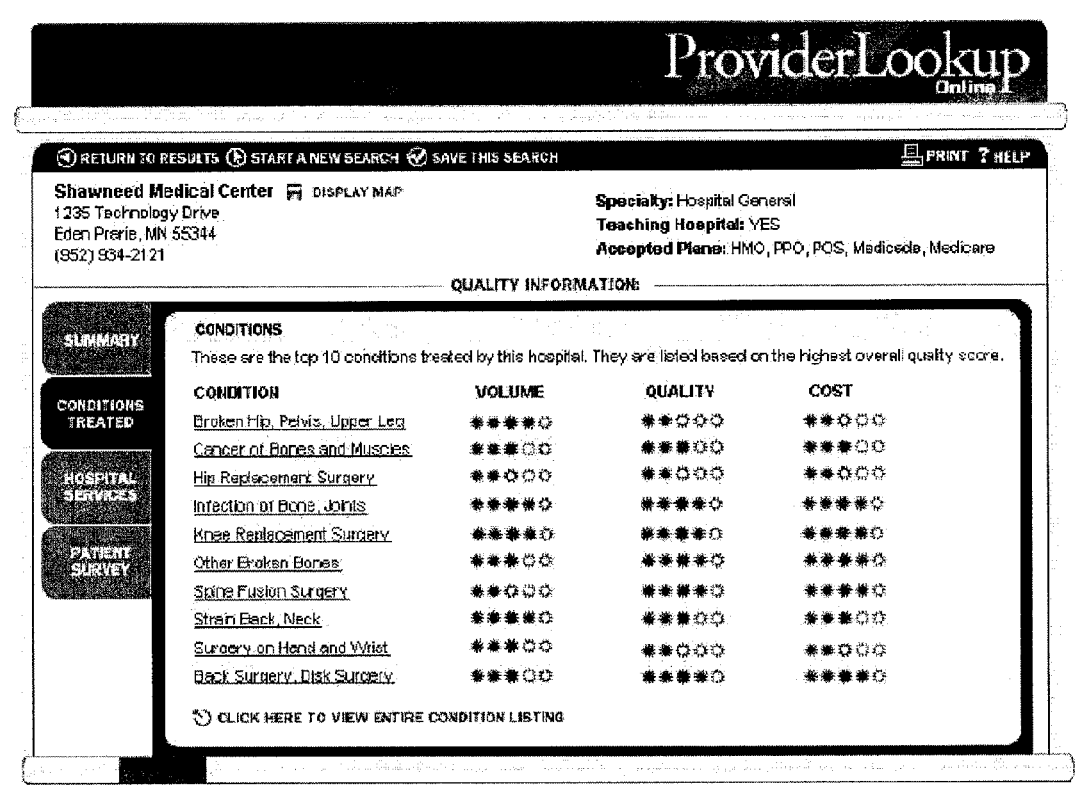

FIG. 15 depicts an exemplary display of hospital rating data associated with a plurality of conditions treated by the hospital.

Figure 16:
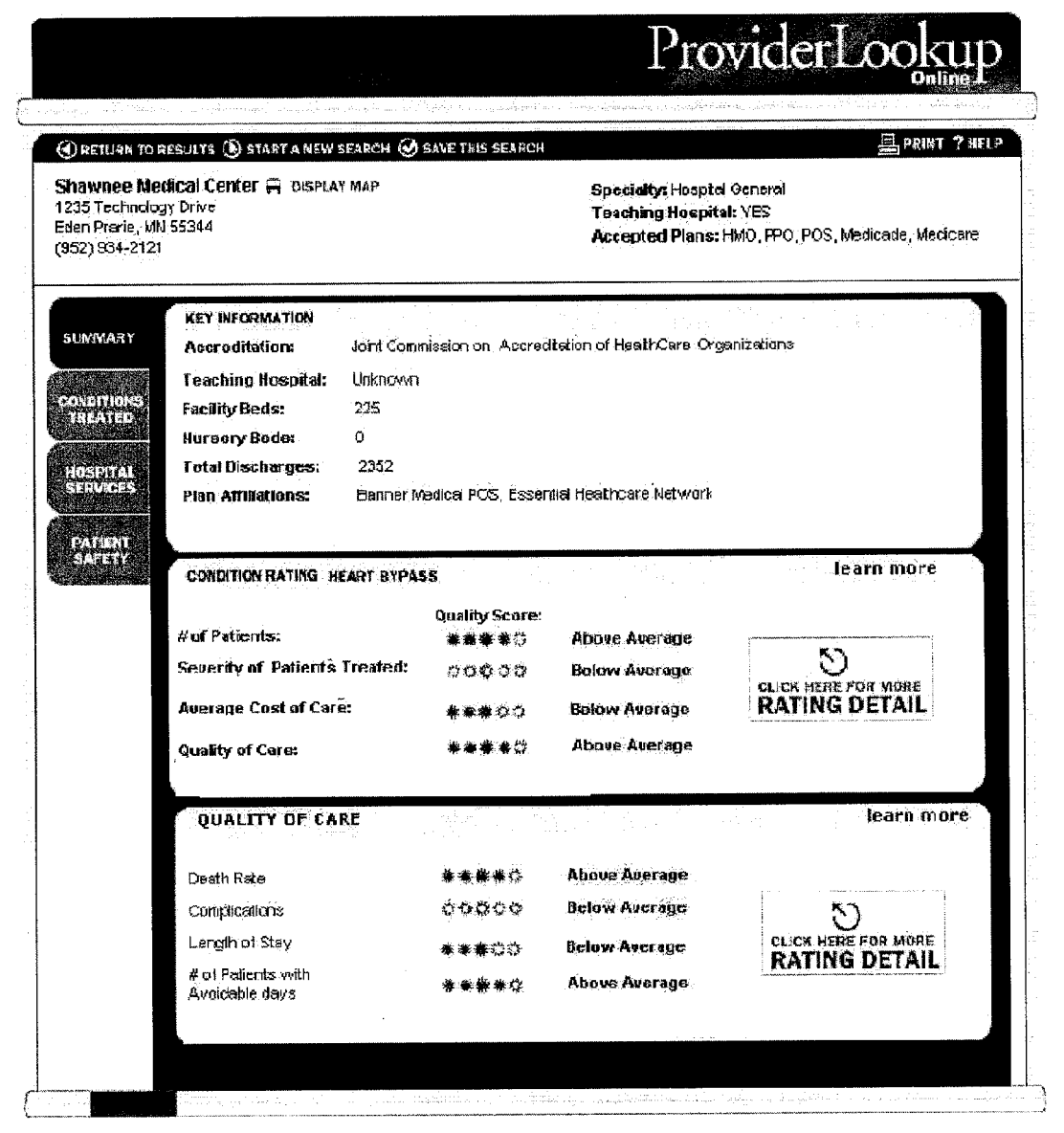

FIG. 16 depicts exemplary hospital summary rating information for a selected condition, such as a heart bypass.

The method and system according to the present invention may be implemented using various combinations of software and hardware as would be apparent to those of skill in the art and as desired by the user. The present invention may be implemented in conjunction with a general purpose or dedicated computer system having a processor and memory components.

From the above description and drawings, it will be understood by those of ordinary skill in the art that the particular implementations shown and described are for purposes of illustration only and are not intended to limit the scope of the present invention. Those of ordinary skill in the art will recognize that the present invention may be embodied in other specific forms without departing from its spirit or essential characteristics. References to details of particular implementations are not intended to limit the scope of the invention.

I claim:

1. A computer-implemented method comprising:
receiving, at a computer system having a processor and memory components, a plurality of claim records representing services provided to one or more patients;
grouping, with the processor, the claim records into claim groups, each claim group including claim records representing care provided by one or more providers to one of the patients;
assigning, with the processor, each claim group to a provider;
assessing, with the processor, claim records in each claim group using treatment guidelines for a particular disease or condition associated with the claim group;
generating a compliance score for the claim group, wherein the compliance score indicates an extent to which the claim records in the claim group match the treatment guidelines;
aggregating, with the processor, compliance scores for each claim group to generate a raw aggregate compliance score for each provider;
normalizing, with the processor, the raw aggregate compliance scores to generate a normalized aggregate compliance score for each provider; and
generating, with the processor, a provider quality rating for each provider using the normalized aggregate compliance score.

2. The method of claim 1, wherein the claim groups comprise one or more of facility claims, pharmacy claims, laboratory claims, and physician claims.

3. The method of claim 1, wherein the claim groups comprise facility claims representing inpatient care provided by a hospital to a patient.

4. The method of claim 1, wherein the guidelines comprise evidence based medicine guidelines.

5. The method of claim 1, wherein the aggregate raw compliance score, the normalized aggregate compliance score, and the provider quality rating data are calculated separately for each condition or disease treated by each provider.

6. The method of claim 1, wherein the aggregate raw compliance score, the normalized aggregate compliance score, and the provider quality rating data are calculated to include all conditions and diseases treated by each provider.

7. The method of claim 1, wherein a defined scale is used to generate the normalized aggregate compliance score.

8. The method of claim 1, wherein the raw aggregate compliance score is normalized using average aggregate compliance values for a geographical region in which the provider is located.

9. The method of claim 1, wherein the provider quality rating comprises one or more performance categories that identify each provider's quality of treatment in comparison to an average value.

10. The method of claim 1, wherein the provider quality rating comprises one or more performance categories that indicate each provider's quality of treatment in comparison to others of the providers.

11. The method of claim 1, wherein the provider quality rating comprises graphic symbols that identify each provider's quality of treatment in comparison to an average value.

12. The method of claim 1, wherein the raw aggregate compliance score for each provider is a weighted sum of the aggregate compliance score of claim groups assigned to the provider and at least one additional utilization measure attributable to the provider.

13. The method of claim 12, wherein the raw aggregate compliance score is a weighted sum of the aggregate compliance score of claim groups assigned to the provider and a utilization measure comprising one or more of a number of inpatient days per year, a number of emergency room visits per year, and a number of outlier procedures per year.

14. The method of claim 12, wherein the raw aggregate compliance score is a weighted sum of the aggregate compliance score of claim groups assigned to the provider and a utilization measure comprising one or more of a death rate value, a complication rate value, a length of stay value, and a number of avoidable days per year.

15. The method of claim 1, further comprising generating provider volume data comprising a number of conditions or procedures performed by each provider.

16. A computer-implemented system for generating healthcare provider quality rating data, comprising:
a computer system configured for receiving a plurality of claim records representing services provided to one or more patients;
memory comprised within the computer system, the memory configured for storing the claim records; and
a processor in communicative coupling with the memory, the processor configured for:
grouping the claim records into episodes of care, wherein each episode of care comprises claim records that relate to treatment of one of the patients for a particular disease or condition;
assigning each episode of care to a responsible provider;
assessing, with the computer system, the claim records in each episode of care using treatment guidelines for a particular disease or condition associated with the episode of care;
generating, with the computer system, a compliance score for the episode of care, wherein the compliance score indicates an extent to which the claim records in the episode of care match the guidelines;
aggregating, with the computer system, the compliance score for each episode of care assigned to each provider to generate a raw aggregate compliance score for each provider;
normalizing, with the computer system, the raw aggregate compliance scores to generate a normalized aggregate compliance score for each provider; and
generating, with the computer system, provider quality rating data for each provider using the normalized aggregate compliance score.

17. A computer-implemented system for generating healthcare provider cost rating data, the system comprising:
a processor configured for receiving a plurality of claim records representing services provided to one or more patients for a particular disease or condition; and
memory in communicative coupling with the processor, the memory configured for storing the claim records;
wherein the processor is further configured for:
grouping the claim records into claim groups, each claim group including claim records representing care provided to one of the patients;
assigning each claim group to a provider;
calculating a total cost of each claim group, wherein the total cost is a sum of costs associated with each claim record in the claim group;
aggregating the total cost for each claim group to obtain a raw aggregate cost score for each provider;
comparing the total cost of each claim group for each provider to an expected cost value for each claim group;
normalizing the raw aggregate cost scores for each provider to a defined scale based on the expected cost value to generate a normalized aggregate cost score for the provider; and
generating provider cost rating data for each provider using the normalized aggregate cost scores.

18. The system of claim 17, wherein the claim groups comprise at least one of facility claims, pharmacy claims, laboratory claims, and physician claims.

19. The system of claim 17, wherein the claim groups comprise facility claims representing inpatient care provided by a hospital to one of the patients.

20. The system of claim 17, wherein the expected cost value for each claim group is an average risk-adjusted cost value calculated from historical cost data.

21. The system of claim 17, wherein the provider cost rating data are calculated separately for each condition or disease treated by the provider.

22. The system of claim 17, wherein the provider cost rating data are calculated to include all conditions and diseases treated by the provider.

23. The system of claim 17, wherein the provider cost rating data indicate the provider's cost of treatment in comparison to an average value.

24. The system of claim 17, further comprising generating provider volume data comprising a number of conditions or procedures performed by the provider.

25. A computer-implemented system comprising:
a computer system configured for receiving claim records representing services provided to one or more patients;
memory comprised within the computer system, the memory configured for storing the claim records; and
a processor in communicative coupling with the memory, the processor configured for:
grouping the claim records into episodes of care that relate to treatment of one of the patients for a particular disease or condition;
assigning each episode of care to a healthcare provider;
calculating a total cost of each episode of care, wherein the total cost is a sum of costs associated with each claim record in the episode of care;
aggregating the total costs for each episode of care to obtain a raw aggregate cost score for each provider;
comparing the total cost of each episode of care for each provider to an expected cost value for the disease or condition;
normalizing the raw aggregate cost score to a defined scale based on the expected cost value to generate a normalized aggregate cost score for the provider; and
generating provider cost rating data using the normalized aggregate cost score.

* * * * *